(12) United States Patent
Warren

(10) Patent No.: US 7,330,258 B2
(45) Date of Patent: Feb. 12, 2008

(54) SPECTROMETER DESIGNS

(75) Inventor: Chris P. Warren, Carlsbad, CA (US)

(73) Assignee: Innovative Technical Solutions, Inc., Honolulu, HI (US)

( * ) Notice: Subject to any disclaimer, the term of this patent is extended or adjusted under 35 U.S.C. 154(b) by 249 days.

(21) Appl. No.: 11/141,355

(22) Filed: May 31, 2005

(65) Prior Publication Data

US 2006/0268269 A1 Nov. 30, 2006

Related U.S. Application Data

(60) Provisional application No. 60/685,217, filed on May 27, 2005.

(51) Int. Cl.
*G01J 3/28* (2006.01)
(52) U.S. Cl. .................................................... 356/328
(58) Field of Classification Search ................ 356/326, 356/328; 250/339.02
See application file for complete search history.

(56) References Cited

U.S. PATENT DOCUMENTS

| 3,748,015 | A | | 7/1973 | Offner | |
|---|---|---|---|---|---|
| 4,293,186 | A | | 10/1981 | Offner | |
| 4,693,569 | A | | 9/1987 | Offner | |
| 4,747,678 | A | | 5/1988 | Shafer et al. | |
| 5,880,834 | A | * | 3/1999 | Chrisp | 356/328 |
| 6,023,330 | A | * | 2/2000 | Marshall et al. | 356/328 |
| 6,081,331 | A | * | 6/2000 | Teichmann | 356/328 |
| 6,100,974 | A | * | 8/2000 | Reininger | 356/300 |
| 6,266,140 | B1 | * | 7/2001 | Xiang et al. | 356/328 |
| 6,278,534 | B1 | * | 8/2001 | Arns | 359/15 |
| 6,303,934 | B1 | * | 10/2001 | Daly et al. | 250/339.02 |
| 6,862,092 | B1 | * | 3/2005 | Ibsen et al. | 356/328 |
| 2002/0060792 | A1 | * | 5/2002 | Ibsen et al. | 356/328 |
| 2006/0038997 | A1 | * | 2/2006 | Julian et al. | 356/328 |

OTHER PUBLICATIONS

"Material Properties—Synthetic Fused Silica" 2002, Melles Griot Inc. ☐☐http://www.mellesgriot.com/products/optics/mp_3_2.htm.*

* cited by examiner

*Primary Examiner*—Michael P. Stafira
(74) *Attorney, Agent, or Firm*—Knobbe, Martens, Olson & Bear, LLP

(57) ABSTRACT

Various embodiments include spectrometers comprising diffraction gratings monolithically integrated with other optical elements. These optical elements may include slits and mirrors. The mirrors and gratings may be curved. In one embodiment, the mirrors are concave and the grating is convex. The mirrors and grating may be concentric or nearly concentric.

16 Claims, 3 Drawing Sheets

SPECTROMETER DESIGNS

This application claims priority to U.S. Provisional Patent Application No. 60/685,217 filed May 27, 2005, entitled "Spectrometer Designs" which is incorporated herein by reference in its entirety.

BACKGROUND

1. Field of the Invention

The invention described herein relates to spectrometers including, for example, spectrometers having gratings monolithically integrated with other optical elements.

2. Description of the Related Art

Spectrometers are optical instruments that determine the spectral content of an optical signal. The output of a spectrometer is a spectral distribution of intensity versus wavelength, referred to herein as a spectrum.

Spectrometers are very useful in a myriad of scientific and technological applications and are the basis of spectroscopy. Spectroscopy may, for example, help identify the composition of materials and may provide information regarding different physical and chemical processes.

Imaging spectrometers are a special type of spectrometer that produces wavelength spectrums for different spatial locations in a two-dimensional field. Imaging spectroscopy can be accomplished by producing spectrums for a plurality of sites along one swath of the two-dimensional field. A recording device, such as an array of photodetectors, is located at an image plane to record the spectral information for locations across the swath. The instrument is then swept over the next swath and the spectral response of each portion of the new swath is measured in a like manner. Spectroscopic information can thereby be obtained for a two-dimensional array of locations.

Spectrometers are used both in the laboratory and in the field. For various applications imaging spectrometers may be included as payloads in satellites, airplanes, or unmanned aerial vehicles (UAVs). Such spectrometers may be used, for example, for remote sensing and reconnaissance. In the case of imaging spectrometers on satellite and airplane platforms, the instrument can be scanned over the two-dimensional field by the motion of the platform itself. In this way, a map over the spectral response of the entire two-dimensional field can be created.

Two characteristics of spectrometers that are therefore desirable are rigidity and small size. Rigidity can be important to ensure that the instrument maintain precise alignment of optical components to achieve desired performance. Over its lifetime the instrument can be subjected to vibration and other physical stresses that can degrade instrument performance if proper alignment of the optical components is lost. These types of physical stresses can occur during rocket launch of a satellite payload or during turbulence or during maneuvering and landing of an airplane or UAV, for example. Small size is also important because space is generally limited for airplane and UAV based instruments and especially in the case of satellite missions where extra size and weight can add significantly to the cost of placing the satellite in orbit. There is a need, therefore, for a spectrometer with increased ruggedness and decreased size.

SUMMARY

One embodiment of the invention comprises a spectrometer comprising: a first body portion comprising substantially optically transmissive material; first and second reflective regions disposed on a first side of said first body portion; a reflective grating disposed on a second side of said first body portion; and a second body portion comprising substantially optically transmissive material joined to said first body portion with said reflective grating disposed therebetween, wherein said first and second reflective regions and said reflective grating are arranged with respect to each other such that light incident on said first reflective region is reflected to said grating, diffracted from said grating to said second reflective portion, and reflected from said second reflective portion into said second body portion.

Another embodiment of the invention comprises a spectrometer comprising: a body comprising a mass of substantially optically transmissive material; a first reflector; a curved reflective grating, said first reflector and said curved reflective grating defining a first optical path therebetween, said first reflector and said reflective grating disposed with respect to said body such that said first optical path substantially comprises said substantially transmissive material; and a detector defining a second optical path extending from said curved reflective grating to said detector, said second optical path substantially comprising said substantially transmissive material.

Another embodiment of the invention comprises a spectrometer comprising: a body comprising a mass of substantially optically transmissive material; a first curved reflector; and a reflective grating, said first curved reflector and said reflective grating defining a first optical path therebetween, said first curved reflector and said reflective grating disposed with respect to said body such that said first optical path substantially comprises said substantially transmissive material, wherein said reflective grating is configured to reflect broadband light having a bandwidth of at least about 400 nanometers to a detector via a second optical path comprising said substantially transmissive material.

Another embodiment of the invention comprises a spectrometer comprising: a first body portion comprising substantially optically transmissive material; first and second reflective regions disposed on a first side of said first body portion; and a reflective grating disposed on a second side of said first body portion; wherein said first and second reflective regions and said reflective grating are arranged with respect to each other such that broadband light at least about 300 nanometers in bandwidth propagating through said substantially optically transmissive material incident on said first reflective region is reflected to said grating, diffracted from said grating through said substantially optically transmissive material to said second reflective region, and reflected from said second reflective region through said optically transmissive material.

Another embodiment of the invention comprises a spectrometer comprising: a medium comprising substantially optically transmissive material; a slit; and a reflective grating, said slit and said reflective grating defining a first optical path therebetween, said slit and said reflective grating disposed with respect to each other and said medium such that said first optical path substantially comprises said substantially transparent material.

Another embodiment of the invention comprises a spectrometer configured to be mounted in an unmanned airborne vehicle, the spectrometer comprising: a body comprising a mass of substantially optically transmissive material; a first reflector; a reflective grating, said first reflector and said reflective grating defining a first optical path therebetween, said first reflector and said reflective grating disposed with respect to said body such that said first optical path substantially comprises said substantially transmissive material, said reflective grating being configured to reflect light to a detector via a second optical path comprising said substantially transmissive material; and a housing in which said body, said first reflector, and said reflective grating are positioned, wherein said housing is no greater than 1000 cubic centimeters, and said housing is configured to be mounted in an unmanned airborne vehicle receiving area.

DETAILED DESCRIPTION OF PREFERRED EMBODIMENTS

Figure 1:
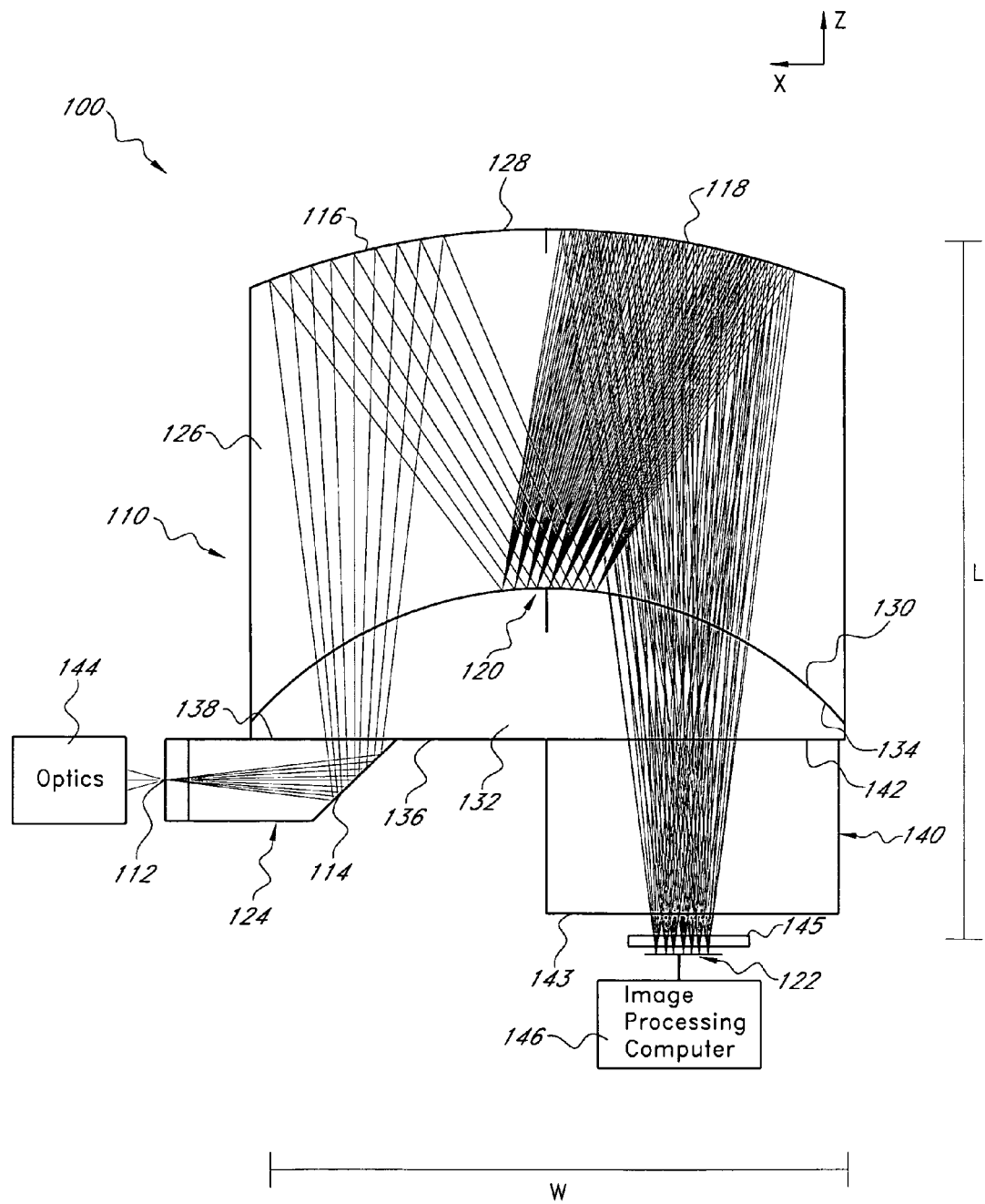
FIG. 1 is a schematic view of one embodiment of a spectrometer comprising a convex diffraction grating and a pair of concave mirrors integrated together in a monolithic structure.

FIG. 1 schematically illustrates one embodiment of an imaging spectrometer 100. The spectrometer instrument 100 comprises a generally monolithic assemblage of optical components that are integrated together using a rigid support structure or main body 110 comprising substantially optically transmissive material. As shown in FIG. 1 and discussed more fully below, light collected by the example spectrometer 100 propagates through the optically transmissive material comprising the support structure 110 interacting with optical components integrated thereon and/or therein.

In this example, these optical components include an entrance slit 112, a reflective surface 114, first and second curved mirrors 116, 118, a diffraction grating 120, and a sensor 122. The entrance slit 112 is disposed on a turn mirror block 124 that includes the reflective surface 114. The first and second curved mirrors 116, 118 and diffraction grating 120 are disposed on different sides of a meniscus block 126. This meniscus block 126 has first and second curved surfaces 128, 130. The first and second curved mirrors 116, 118 are disposed on the first curved surface 128 and the grating 120 is disposed on the second curved surface 130.

The spectrometer instrument 100 further comprises a plano-convex block 132 having a first curved surface 134 and a second flat surface 136. The first curved surface 134 on the plano-convex block 132 mates with the second curved surface 130 on the meniscus block 126. The turn block 124 also has a planar surface 138 that is butt up against the second flat surface 136 of the plano-convex block 132. The spectrometer 100 further comprises an output block 140 having first and second planar surfaces 142, 143. The first planar surface 142 on the output block 140 is butt up against the second flat surface 136 of the plano-convex block 132. A substantially optically transmissive adhesive may be used to attach the turn block 124 and the output block 140 to the plano-convex block 132 and the plano-convex block to the meniscus block 126. In various preferred embodiments, the substantially optically transmissive adhesive has an index of refraction substantially matching that of the turn block 124, the output block 140, the plano-convex block 132, and the meniscus block 126 to reduce Fresnel reflection.

In certain preferred embodiments, the spectrometer is substantially compact. For example, the monolithic structure 110 comprising the turn block 124, the output block 140, the plano-convex block 132, and the meniscus block 126 bonded together with adhesive may have a length, L, as shown in FIG. 1, between about 25 millimeters (mm) and 75 mm and a width, W, as shown, between about 20 mm and 60 mm. The thickness, not shown in FIG. 1, may be between about 10 mm and 30 mm. Discussions outside these ranges are also possible. In one embodiment, the monolithic structure 110 has dimensions of approximately 50 mm long, 40 mm wide, and 22 mm high, although the structure may be larger or smaller. In certain embodiments, the spectrometer 100 is also light. The monolithic structure comprising the turn block 124, the output block 140, the plano-convex block 132, and the meniscus block 126 together may, for example, weigh between about 50 grams and 1000 grams, but may be heavier or lighter in other embodiments.

The spectrometer 100 further comprises imaging optics 144 shown in block diagram form in FIG. 1. An optical path extends from the imaging optics 144 to the slit 112. The spectrometer 100 also may comprise a processor or computer 146 configured to collect images from the sensor 122. This processor 146 may comprise electronics electrically connected to the sensor 122, which may comprise a two-dimensional detector array such as a CMOS or CCD solid state detector array or a HgCdTe or InSb solid state detector array. The image sensor 122 may be included in a package and may optionally be cooled by a cooler.

In certain preferred embodiments, light propagates along an optical path through the instrument 100 substantially as follows. Light emanates or reflects from a remote object (not shown) and is collected by the imaging optics 144. The remote object can be, for example, the ground below in a UAV application. The imaging optics 144, which represents optics suitable for conditioning light to serve as the input to the instrument 100, forms an image of the remote object onto the entrance slit 112 of the spectrometer instrument 100. The light passes through the entrance slit 112, diverging, and enters the optically transmissive medium which comprises the majority of the optical path through the instrument 100. The emerging light beam is directed toward the reflective surface 114 in the turn block 124. This reflective surface 114 is oriented to redirect the light about 90° in the embodiment shown in FIG. 1 through the plano-convex block 132 and the meniscus block 126 to the first mirror 116. The diverging light beam reflects from the first mirror 116, a concave mirror that produces a converging beam.

The first mirror 116 directs the light through the substantially transmissive material in the meniscus block 126 to the grating 120. The grating 120 is a convex surface that converts the converging beam from the first mirror 116 into a diverging beam. The grating 120 also diffracts the beam. One order of the diffracted beam is directed to the second mirror 118. The grating 120 also introduces dispersion such that different wavelengths are diffracted at distinct angles thereby spatially separating the different wavelength components. The diffracted beam propagates through the substantially optically transmissive material in the meniscus block 126 to the second mirror 118, which comprises a concave reflecting surface. Accordingly, the divergent diffracted beam is converted into a convergent beam directed through the substantially optically transmissive material in the meniscus block 126, the plano-convex block 132, and the output block 140. After exiting the output block 140, the light strikes the sensor 122, which converts optical energy across the spatial extent of the sensor into electrical signals which may be recorded and/or processed. The sensor 122, a two-dimensional detector array, produces signals indicative of the spatial distribution of the intensity on the sensor. These signals are conveyed to the computer 146 for image processing.

In certain preferred embodiments, the spectrometer is configured for light having a broad bandwidth, e.g., about 200, 300, or 400 nanometers (nm) or more. For example, certain embodiments are configured for visible light having a wavelength between about 400-800 nm or 450-900 nm. The design (e.g., shape, size, materials, etc.) and location of the optical components (e.g., grating, reflectors, detector, etc.) may be selected such that broadband light can be processes by the spectrometer 100. Larger or smaller bands are also possible.

The imaging optics 144 may comprise one or more lens elements in certain embodiments. For example, the imaging optics 144 may comprise a lens or lens system similar to that used in a camera. Zoom or wide field optics may be employed. The imaging optics 144 may have a focal length between about 20-100 millimeters (mm) and an f-number between about 2 and 4 in some embodiments, although values outside these ranges are possible. The imaging optics 144 are disposed with respect to the slit 112 to form an image on the slit. This image may, for example, be about 5 mm to 25 mm wide and high in certain embodiments, and the imaging optics 144 may be a distance, e.g., between about 5 mm and 100 mm from the slit. The type and configuration of the imaging optics, however, is not limited as other types of imaging optics and other designs can be employed. The image formed on the slit 112 will also vary in size and shape.

Figure 2:
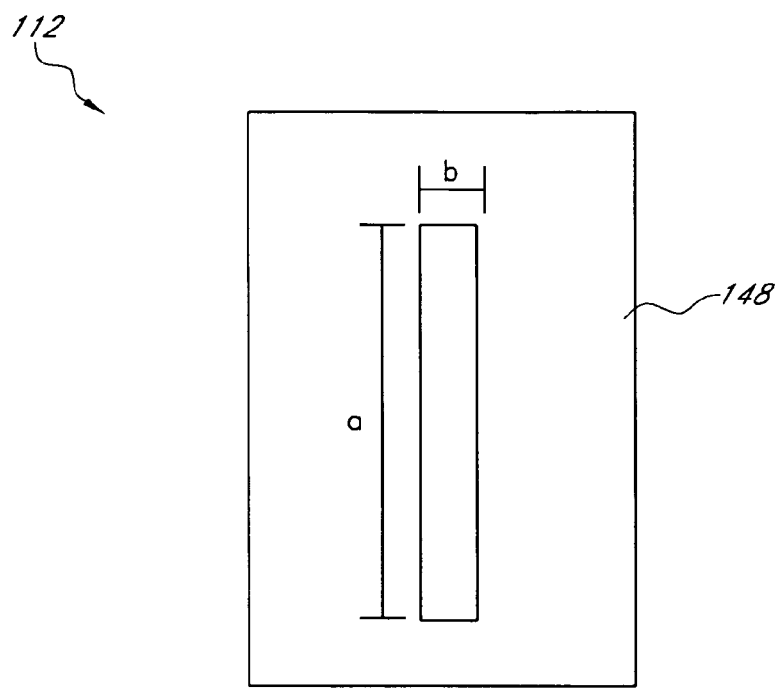
FIG. 2 is a schematic view of an example spectrometer entrance slit.

An exemplary slit 112 is depicted in FIG. 2. The slit 112 may have a height, a, between about 5 mm and 25 mm, e.g., about 10 mm, and a width, b, between about 5 microns and 50 microns, e.g., about 10 microns. More generally, the slit 112 is an aperture through which light enters the spectrometer 100. This aperture 112 may have different shapes and different dimensions as well. In certain preferred embodiments where the spectrometer 100 comprises an imaging spectrometer, the slit 112 is elongated so as to pass light corresponding to an elongated portion of the image field, referred to above as a swath. In some embodiments, however, the aperture 112 may not be elongated and may, e.g., be a point aperture comprising a small round hole. Such apertures may be used for non-imaging spectrometers, for example.

The aperture 112 may comprise an opening in a mask 148 comprising, for example, metal or other opaque material. This metal may be deposited on a front surface of the turn block 124; see FIG. 1. The mask 148 and aperture 112 may be formed using photolithographic techniques. In other embodiments, the mask 148 may be attached to the front surface of the turn block 124, for example, by adhesive. Other types of apertures 112 may be used and the aperture may be secured to the spectrometer 100 in other ways. The aperture 112 may also be located elsewhere. For example, in embodiments that do not employ the turn block 124, the aperture 112 may be disposed on the surface 136 of the plano-convex block 132. Alternatively, the aperture 112 may be separate from the main body 110 of the spectrometer 100. Other configurations are also possible.

The turn block 124, shown in FIG. 1, may comprise substantially optically transmissive material such as, for example, glass. Fused silica may be employed in certain preferred embodiments. Other materials may be employed as well. The front face of the turn block 124 may be polished. As described above, the aperture 112 can be disposed on this front face. The turn block 124 may further be polished to form the reflective surface 114. Light propagating from the slit 112 through the turn block 124 may be reflected from this reflective surface 114 by total internal reflection. Alternatively, the reflective surface 114 may comprise a reflective material such as metal or a dielectric reflector. Other designs are possible.

As discussed above, the reflective surface 114 may be oriented to direct the light propagated through the slit 112 along a path toward the first mirror 116. This reflective surface 114 may therefore be oriented at about 90° in some embodiments; however, the orientation may vary depending on the configuration and design.

The turn block 124 may assist in the packaging and arrangement of the components. For example, the turn block 124 may allow the imaging optics 144 to be farther away from the sensor 122. In certain embodiments, however, the turn block 124 and/or the reflective surface 114 may be excluded. For example, the light beam from the slit 112 may directly propagate to the first mirror 116 without being redirected by a reflective element.

Figure 3:
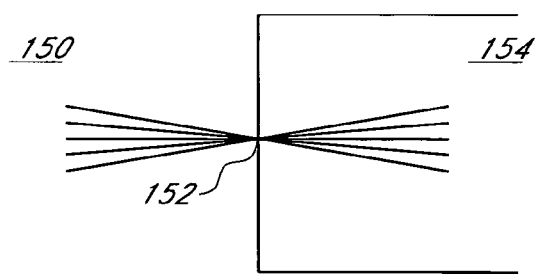
FIG. 3 is a schematic view of light incident upon the entrance slit of an example spectrometer where the propagation medium on either side of the slit has the same index of refraction.
Figure 4:
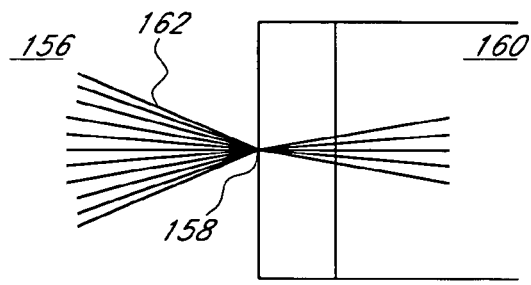
FIG. 4 is a schematic view of light incident upon the entrance slit of an example spectrometer comprising material having a high index of refraction that causes the light entering the spectrometer through the slit to have a reduced cone angle within the instrument.

As demonstrated by FIGS. 3 and 4, the substantially optically transmissive material of the turn block 124 and other components comprising the main body 110 through which the light propagates in the spectrometer may advantageously enable a more compact design. These components include, for example, the plano-convex block 136 and the meniscus block 126 shown in FIG. 1.

In particular, the substantially optically transmissive material may have a higher index of refraction than that of the environment surrounding the spectrometer 100 such that light is refracted upon entering the spectrometer 100. A comparison is presented in FIGS. 3 and 4 of the cases where light propagates through air within the spectrometer 100 and light propagates through a medium having a higher refractive index in the spectrometer 100. In particular, FIG. 3 shows light propagating through a region 150 comprising air and passing through an aperture 152 into a region 154 also comprising air. No refraction is present as the medium is the same on both sides of the aperture 152. In contrast, FIG. 4 shows light propagating through a region 156 comprising air and passing through an aperture 158 into a region 160 comprising material such as glass, which has a higher refractive index than air. The light is refracted. FIG. 4 shows how a cone of light rays 162 passing through the aperture 158 has a smaller size within the material than in the air. This reduction in the size of the cone of rays 162 enables optics having a smaller size to be used in the spectrometer design.

As shown in FIG. 1, a cone of rays entering the spectrometer 100 through the slit 112 is refracted in the turn block 124 comprising a substantially optically transmissive material having a higher refractive index. The resultant cone of rays in the turn block 124 and similarly in the spectrometer 100 comprising the substantially optically transmissive material is likewise reduced. Smaller optics can therefore be used. Accordingly, the optics within the spectrometer 100 may have a higher f-number (or reduced numerical aperture). Nevertheless, the spectrometer 100 collects a larger cone of light equivalent to a smaller f-number (or increased numerical aperture). A compact spectrometer design that collects more light can thus be achieved by propagating the light within the spectrometer 100 through a medium having a higher refractive index than the medium outside the spectrometer, which will likely comprise air or vacuum. Accordingly, the light is propagated through the main body 110 in the spectrometer 100, which comprises a substantially optically transmissive material such as glass, which has an index of refraction of about 1.5 in some cases.

As discussed above in connection with FIG. 1, the main body 110 of the spectrometer 100 further comprises the plano-convex block 132. This plano-convex block 132 comprises substantially optically transmissive material, such as glass, having an index of refraction greater than air or vacuum. The plano-convex block 132 may also comprise fused silica in certain preferred embodiments. The plano-convex block 132 may be polished to provide the first curved surface 134 and a second flat surface 136. The curved surface 134 may be spherically shaped. The distance separating the first curved surface 134 and a second flat surface 136 at the center may be between about 5 mm and 20 mm. This plano-convex block 132 may have a width between about 20 mm and 60 mm. The radius of curvature of the first curved surface 134 may be between about 15 mm and 30 mm and may match the curvature of the grating 120 in certain preferred embodiments. Other dimensions can also be used.

As discussed above, the planar surface 138 of the turn block 124 is butt up against the second flat surface 136 of the plano-convex block 132. Light from the slit 112 thus is reflected by the reflective surface 114 on the turn block 124 into the plano-convex block 132. This light propagates through the higher index material comprising the plano-convex block 132.

Adhesive may be used to bond the planar surface 138 on the turn block 124 to the second flat surface 136 on the plano-convex block 132. This adhesive may have an index of refraction substantially similar to the substantially optically transmissive material comprising the turn block 124 and the plano-convex block 132. Such index matching may reduce Fresnel reflections.

As discussed above in connection with FIG. 1, the main body 110 of the spectrometer 100 further comprises the meniscus block 126. This meniscus block 126 also comprises substantially optically transmissive material, such as glass, having an index of refraction greater than air or vacuum. The meniscus block 126 may comprise fused silica in certain preferred embodiments. The meniscus block 126 may be polished to provide the first and second curved surfaces 128, 130. These curved surfaces 128, 130 may be rotationally symmetrical, and more particularly, spherically shaped. The distance separating the first and second curved surfaces 128, 130 at the center (e.g., through the optical axis) may be between about 10 mm and 30 mm. This concave-convex block 126 may have a width between about 20 mm and 60 mm. The radius of curvature of the first curved surface 128 may be between about 30 mm and 60 mm and may have the same center of curvature of the second curved surface 130 as discussed more fully below. The curvature of the second curved surface 130 may be between about 15 mm and 30 mm and may be about one-half the radius of curvature of the first curved surface 128 in some embodiments also discussed below. Other dimension can be used as well. In certain embodiments, the radius of curvature of the second curved surface 130 matches the curvature of the grating 120 in certain embodiments.

The first and second curved mirrors 116, 118 are disposed on the first curved surface 128 and the grating 120 is disposed on the second curved surface 130. The first and second curved mirrors 116, 118 may be formed, for example, by metallizing portions of the first curved surface 128 on the meniscus block 126. A metallized region may extend through and include both the first curved mirror 116 and the second curve mirror 118. In other embodiments, separated regions of metallization may be used to form the first and second curved mirrors 116, 118. Dielectric coatings may be employed in some embodiments.

Other methods of forming mirrors on the first curved surface 128 may also be used. In some embodiments, the first and/or second mirrors 116, 118 are mounted proximal to, possibly spaced apart from, the first curved surface 128. Index matching material may be used in such embodiments to reduce reflection. In some embodiments, adhesive having suitable refractive index to reduce Fresnel reflection may be employed to adhere the mirrors 116, 118 to the first curved surface 128. Still other methods may be used to provide reflective surfaces near the first curved surface.

The curved grating 120 may be formed on the second curved surface 130 of the meniscus block 126, for example, using photolithographic techniques. For example, metal may be deposited on the second curved surface 130 and patterned using, e.g., photoresist. Other approaches may be employed. The grating 120 comprises a holographic optical element formed by holographic techniques. In some embodiments, low diffractive orders (e.g., n=1, etc.) are used. Low diffractive orders such as n=2, 3, 4, or 5 could also be used. The low order may, for example, be directed to the second mirror 118 and conveyed to the sensor 122. Other orders may also be used.

In some embodiments, the grating 120 is mounted proximal to, possibly spaced apart from, the second curved surface 130. Index matching material may be used in such embodiments to reduce reflection. Accordingly, in some embodiments, the first and second curved mirrors 116, 118 can be spaced apart from (but disposed on a first side of) the meniscus block 126 and the grating 120 can be spaced apart from (but disposed on a second side of) the meniscus block. Still other configurations are possible.

As discussed above, the plano-convex block 132 is mated with the meniscus block 126. The first curved surface 134 on the plano-convex block 132 may be butt up against the second curved surface 130 on the meniscus block 126. Adhesive may be used to bond the two surfaces 134, 130 together. This adhesive may have an index of refraction substantially similar to the substantially optically transmissive material comprising the meniscus block 132 and the plano-convex block 132. Such index matching may reduce Fresnel reflections.

Accordingly, light from the slit 112 is reflected by the reflective surface 114 on the turn block 124 into the plano-convex block 132 and through the substantially optically transmissive material in the meniscus block 126. The light reaches the first mirror 116 where the light is reflected back through the substantially optically transmissive material in the meniscus block 126 to the diffraction grating 120. This light is diffracted by the reflective grating 120 and is directed once again through the substantially optically transmissive material comprising the meniscus block 126 to the second mirror 118. The light is reflected from the second mirror 118 again through the optically transmissive material in the meniscus block 126 and proceeds into the plano-convex block 132. Accordingly, the light propagates substantially through high index material between the slit 112 and the first mirror 114, the first mirror and the grating 120, the grating and the second mirror 118 and to the plano-convex block 132. The light also propagates through high index material within the plano-convex block 132.

As discussed above in connection with FIG. 1, the main body 110 of the spectrometer 100 also comprises the output block 140. This output block 140 similarly comprises substantially optically transmissive material, such as glass, having an index of refraction greater than air or vacuum. The output block 140 may comprise fused silica in certain preferred embodiments. The output block 140 may be polished to provide first and second planar surfaces 142, 143. The distance separating the first and second planar surfaces 142, 143 at the center may be between about 5 mm and 20 mm. This output block 140 may have a width between about 10 mm and 30 mm. In certain preferred embodiments, the length of the output block 140 is sufficiently large such that a substantial portion of the path from the second mirror 118 to the sensor 122 comprises high index material. The width of the optical block 140 may also be at least as large to accommodate the width of the beam from the second mirror 118 to the sensor 122 in certain embodiments. Other sizes and shapes for the output block 140 are also possible.

As discussed above, the output block 140 is mated with the plano-convex block 132. The first planar surface 142 of the output block 140 may be butt up against the second planar surface 136 of the plano-convex block 132. Adhesive may be used to bond the two surfaces 142, 136 together. This adhesive may have an index of refraction substantially similar to that of the substantially optically transmissive material comprising the plano-convex block 132 and the output block 140. Such index matching may reduce Fresnel reflections.

The spectrometer 100 further comprises the sensor 122 as discussed above. The sensor 122 may comprise a detector array comprising a two-dimensional array of detectors or pixels. Such a sensor 122 may comprise a CMOS detector or a CCD detector. Other types of detectors may also be used. For example, the sensor 112 may comprise mercury cadmium telluride (HgCdTe) or indium antimonide (InSb). Still other types of sensors are possible. The sensor 122 may be sensitive to UV, visible or IR radiation.

Also shown in FIG. 1 is a camera window 145 used to package and protect the image sensor 122. The image sensor 122 may be in a package (not shown). This package may include the window 145 through which light passes to reach the detector array.

The sensor 122 also may be located at the focal plane of the second mirror 118. The sensor 122 may also be located at the conjugate image plane to the slit 112 established by the optics (e.g., the first relay mirror 116, the grating 120, and the second relay mirror 118). Accordingly, the distance from the second mirror 118 to the sensor 122 may be between about 30 mm to 60 mm in some embodiments. The sensor 122 may be located elsewhere as well. Although not shown in FIG. 1, the sensor 122 may be mounted to the output block 140 in some embodiments. As discussed above, the sensor 122 may be located at an image plane conjugate to the slit 112.

In certain preferred embodiments, the sensor 122 is in communication with the imaging processing computer 146 such that intensity spectrums may be recorded. This image processing computer 146 may be in communication with other devices including but not limited to display devices, storage media, or other computing or processing apparatus.

The spectrometer components, e.g., the main body 110, possible the imaging optics 144, sensor 122, and/or image processing computer 146, can be included in or mounted on a housing (not shown). The spectrometer housing may include sockets, threaded holes, bolts, brackets, clamps, and/or other fastening arrangements for mounting, for example, in a compartment or bay or other appropriate location. The housing may further include a connection including power and electrical signals which can be coupled to the sensor 122, scanning actuators, computer or processor 146, cooler, etc., if present.

This housing may protect the spectrometer components. The spectrometer 100 may be included in satellites, airplanes/helicopters, unmanned aerial vehicles or on other platforms as well, such as in boats, ships, trucks, cars, balloons, rockets, or other vehicles. The spectrometers 100 may be located elsewhere such as in stations (e.g., weather or research stations, buoys, etc.) in the field, in laboratories, in manufacturing plants, and in medical facilities. The location and use of these spectrometers is not limited.

As described above, the spectrometer 100 may comprise an imaging spectrometer that produces wavelength spectrums for different spatial locations in a two-dimensional field. The two-dimensional image field can be imaged by the imaging optics 144 onto the slit 122. The slit 144 can selectively pass one swath across the two-dimensional image at a time. Spectrums for a plurality of sites along the swath can be produced as a result of the wavelength dispersion of the grating 120. These spectral distributions are mapped onto the sensor 122 by the second mirror 118. One spectral distribution may, for example, be mapped across a row of photodetectors in the detector array 122. Multiple rows of photodetectors in the sensor 122 may record the spectra for locations across the swath in this example. The two-dimensional image field is shifted with respect to the slit 112 to produce the next swath and the spectra of each portion of the new swath is measured in a like manner. Measurements for multiple swaths can be obtained and assembled to produce spectra for a two-dimensional array of locations. Shifting of the spectrometer 100 which may be mounted on a movable platform such as a satellite, airplane, or UAV may permit multiple swaths to be obtained. In other embodiments, the object may be moved with respect to the spectrometer 100 in other ways. In certain embodiments, for example, movable optics coupled to a processor controlled actuator may be included to sweep through multiple swaths.

In addition to being configured to provide imaging, the optical components 112, 116, 120, 118 may yield well-corrected imaging. As described above, the first and second mirrors 116, 118 and the grating 120 may have substantially the same center of curvature as discussed more fully below. Additionally, the radius of curvature of the first and second mirrors 116, 118 may be substantially the same and may be about one-half the radius of curvature of the grating 120. In certain embodiments, however, the first and second mirrors 116, 118 and the grating 120 may be nearly concentric. The centers may be slightly offset. Such a design provides for improved imaging.

Figure 5:
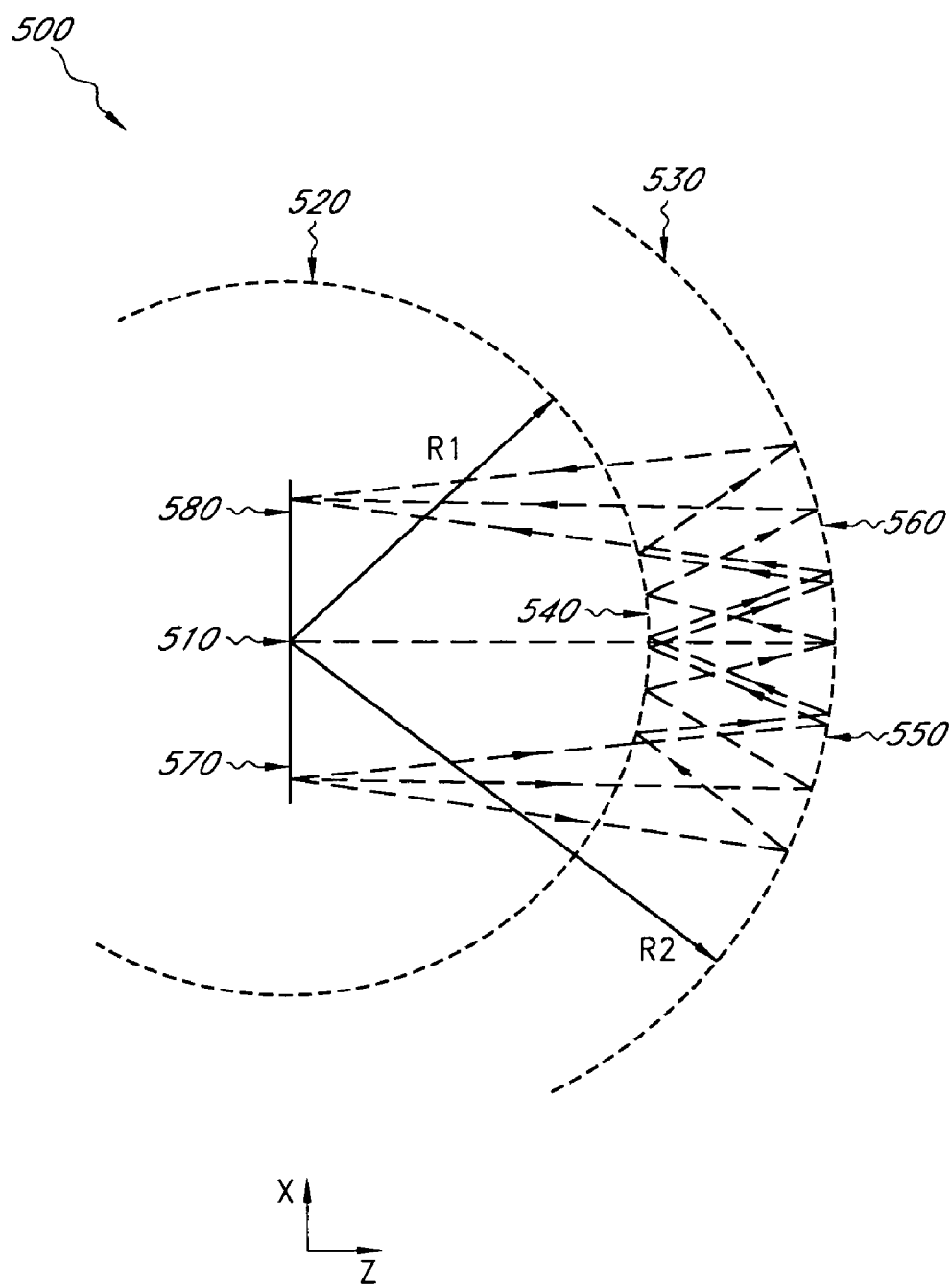
FIG. 5 is a schematic view illustrating one configuration where optical components comprising concentric surfaces are used to produce well-corrected images relatively free of optical aberrations.

FIG. 5 schematically illustrates such an embodiment where optical components 500 comprising concentric surfaces are used to produce a well-corrected image of an object with substantially reduced optical aberrations. The optical path through the configuration shown in FIG. 5 begins at the object plane 570 from which light propagates to a first curved reflector 550. The first curved reflector 550 reflects the light to the curved reflection grating 540 where the light is diffracted and redirected to the second curved reflector 560. The second curved reflector 560 reflects the light to the image plane 580.

The reflection grating 540 has a spherical, convex surface defined by a sphere 520 with radius R1. Similarly, both of the curved reflectors 550 and 560 are spherical concave mirrors whose surfaces are defined by a second sphere 530 with radius R2. Thus, reflectors 550 and 560 have positive power and cause the light passing through the system 500 and incident thereon to converge. Conversely, the reflection grating 540 has negative power and causes the light incident thereon to diverge, as shown. The distance from the object plane 570 to the first curved reflector 550 and from the second curved reflector 560 to the image plane 580 can be approximately equal to the focal length of the curved reflectors 550 and 560. In certain preferred embodiments the radius R2 of the second sphere 530 is approximately twice the radius R1 of the first circle 520. Additionally, the sphere 520 and 530 are substantially concentric about a shared center 510.

The configuration illustrated in FIG. 5 has many advantages from the perspective of an optical imaging system. For example, the illustrated configuration of optical components 500 is characterized by unity magnification which may help to eliminate distortion of the object image formed at the image plane 580. Furthermore, the exact curvatures of the reflection grating 540, the first curved reflector 550, and the second curved reflector 560 can be chosen to display excellent spatial imaging characteristics over the entire image plane 580 by correcting the image for astigmatism and field curvature. Such correction can be accomplished by choosing the curvatures such that the reflection grating 540 and the curved reflectors 550 and 560 each substantially compensate for optical aberrations introduced by one another. Field curvature can thereby be decreased. Chromatic aberration is also reduced as reflecting optical elements are employed. Finally, the configuration of optical elements 500 is relatively simple to manufacture due to the spherical surfaces of the optical components.

The spectrometer 100 in FIG. 1 may be configured according to the design in FIG. 5. In particular, the first and second mirrors 116, 118 and the grating 120 may be substantially concentric. The radii of curvature of the first and second mirrors 116, 118 may be substantially the same. Additionally, the radius of curvature of the grating 120 may be about one-half the radii of curvature of the first and second mirrors 116, 118. Substantial aberration reduction may thereby be provided.

FIGS. 1 and 5 illustrate one possible configuration of optical elements. Many other configurations are possible. Additionally, the design may deviate from perfectly concentric. For example, the center points of spheres 520 and 530 can be offset by as much as 3 mm. This offset may correspond, for example, to as much as about 15% of the radius of curvature, R1. In certain embodiments, the offset is in a direction parallel to the z-axis shown in FIG. 5. Similarly, the length of the radius R2 of sphere 530 can deviate from twice the length of the radius R1 of sphere 520 by as much as 10% of R2. Such offsets may improve performance in certain embodiments. The center of curvatures of the first and second mirrors 116, 118 can also be offset by as much as 5 mm. Similarly, the radii of curvatures of the first and second mirrors 116, 118 can be different by as much as 10%. Values outside these ranges are also possible.

Spectrometer designs other than those specifically recited herein are also possible. For example, additional optical and mechanical components can be incorporated within the instrument 100. In certain embodiments it is also possible to exclude or substitute one or more of the components illustrated in FIG. 1. Similarly, different arrangements and configurations may be used. Different shapes, sizes, and materials may be employed.

For example, an embodiment of the invention may incorporate a single mirror rather than the two mirrors 116, 118 illustrated in FIG. 1. In some embodiments, the mirrors may be excluded. Conversely, additional mirrors may be added. The mirror or mirrors 116, 118 as well as the grating 120 may be shaped differently. The mirrors 116, 118 may be convex or planar. Aspheric, cylindrical, or other shapes are also possible. Similarly the grating 120 may be concave or planar in other embodiments. The grating 120 may be aspheric or cylindrical. As described above, the aperture 112 may comprise a slit, may be a circular or point aperture, or have other shapes. In some embodiments, the aperture 112 may be excluded.

Also as discussed above, the aperture 112 need not be formed on the turn block 124. In some embodiments, for example, the aperture 112 may be formed on the plano-convex block 132. The grating 120 may also be formed on the plano-convex block 132 in certain embodiments; however, forming the grating on a concave surface offers manufacturing advantages. The aperture 112, mirrors 116, 118, and the grating 120 need not be formed directly on the surface of the main body 110, e.g., turn block 124 and the meniscus block 126. Separate structures may be used for the aperture 112, one or more of the mirrors 116, 118, and the grating 120 in other embodiments and these components may be spaced apart from the main body 110. Index matching may be provided in some embodiments. In some embodiments, the first and second curved mirrors 116, 118 can be spaced apart from (but on a first side of) the meniscus block 126 and the grating 120 can be spaced apart from (but on a second side of) the meniscus block. Still other configurations are possible.

The main body 110, for instance, can be configured differently. For example, the main body 110 may be shaped differently and may comprise different components. For example, any one of the turn block 124, plano-convex block 132, meniscus block 126, and output block 140 can be excluded, split into more than one portion, or shaped differently. For example, the meniscus block 126 can be replaced with a block having planar surfaces rather than curved surfaces 128, 130. Similarly, the plano-convex block 132 can have a planar surface instead of a curved surface 134. Alternatively, the shape of the curved surfaces can be changed, for example, from concave to convex or convex to concave or may have other shapes as well. Aspheric, cylindrical, or other shapes may be used in some embodiments. Additionally, curvature may be added in some case. For example, the flat surface 136 on the plano-convex block 132 may be non-flat. Similarly, the surfaces (e.g., front surface, surface 138, and reflective surface 114) on the turn block 124, the second surface 136 on the plane-convex block 132, as well as the surfaces 142, 143 on the output block may be other than flat. These surfaces may be curved to include optical power in some embodiments or may be matched with complementary surfaces.

Additionally, the main body 110 may comprise more or fewer portions. For example, the meniscus-block 126 can be split up into more than one part. Similarly, any of the plano-convex block 132, the turn block 124, and the output block 140 can be split into two or more sections. These sections may be bonded together and index matched in certain embodiments. One or more of the portions 126, 132, 124, 140 of the main body 110 described with reference to FIG. 1 can also be excluded. The output block 140 may be excluded and light may propagate through air to the sensor 122. Alternatively, the plano-convex block 132 may be shaped differently to provide additional material through which the light propagates to the sensor 122. The turn block 124 may be excluded (or arranged so as not to provide a turn.) In some embodiments, the monolithic structure 110 may comprise simply a single portion such as the meniscus block 126 or a differently shaped portion that replaces the meniscus block. A grating and one or more mirrors or a slit may be integrated together with this portion. The sensor 122 may also be included.

While glass and, in particular, fused silica have been disclosed as a suitable substrate material, this does not preclude the use of other materials. Other materials substantially optically transmissive to the wavelength for which the spectrometer is to operate may be used. Other materials may be chosen based on their mechanical and optical properties, such as rigidity, coefficient of thermal expansion, transparency in the selected band of wavelengths, and index of refraction.

Additionally, in certain embodiments, different portions of the main body 110 may comprise different materials. For example, the meniscus block 126 may comprise a first material and the plano-convex block 132 may comprise a second different material. These materials may be closely index matched in certain embodiments and may have coefficients of thermal expansion that yield reduced movement of the optical components with temperature variation. The concentric design and other designs may provide compensation for thermal stresses and thermal expansion in some embodiments.

Different techniques may be used to connect the different portions of the main body 110. As described above, an adhesive or cement may be used to bond the different blocks 124, 132, 124, 140 together. In certain preferred embodiments, these adhesives or cements are substantially optically transmissive to the wavelength of operation and may be have an index similar to that of the blocks to provide index matching. In some embodiments, the blocks contact one another directly and are held in place using methods other than an adhesive. These blocks 124, 132, 124, 140 may be mounted on a structure that holds the blocks in place. Index matching fluid or material may be disposed between the blocks 124, 132, 124, 140. In other embodiments the blocks 124, 132, 124, 140 may be otherwise fused together.

Some benefits and advantages of the embodiments of the present invention described above include rigidness and compact size. As discussed, certain preferred embodiments of the invention have a substantially monolithic design where the optical components of the spectrometer 100 can be disposed on the surface of or embedded in an optically transmissive material, for example fused silica. Because fused silica is a rigid, durable material, the spectrometer 100 exhibits good durability and rigidity. This characteristic presents a significant advantage in terms of alignment of the optical components comprising the instrument. In some embodiments, for example, the optical components of the spectrometer 100 can be fabricated on a surface of one or more blocks of fused silica substrate. The blocks can then be carefully aligned and may be bonded in place. Once bonded together, the instrument acts as a single body of material and can therefore be substantially resistant to the effects of vibration and mechanical shock which might otherwise disrupt the precise optical alignment of the spectrometer instrument 100. Fused silica also has a low thermal expansion coefficient, making for a temperature stable design.

In contrast, other spectrometers may instead employ mechanical alignment mechanisms in the optical mounts for each component, which can increases the size, weight, and cost of the instrument. Furthermore, the non-monolithic design of traditional spectrometers may be prone to misalignment during normal use and its accompanying vibrations and mechanical shocks.

Embodiments of the present invention also advantageously can be designed to have a relatively compact size without necessarily sacrificing important optical performance. Though the size of traditional spectrometers can be decreased by incorporating smaller optical components, decreasing the usable aperture of the instrument can adversely affect its light-gathering power which may have a detrimental affect on the speed of the instrument and the resolution of the image produced. As has been previously discussed, embodiments of the invention alleviate the problem associated with reducing the aperture size of the optical components in the spectrometers by incorporating a substantially optically transmissive material such as fused silica in a majority of the optical path inside the instrument. A spectrometer laid out in fused silica increases the acceptance angle of light entering the instrument. The optical throughput of a spectrometer in fused silica (or other optically transmissive material having an index of refraction greater than that of air or vacuum) is higher than the optical throughput of a like-sized spectrometer where the optical path comprises air or a vacuum. Use of a higher refractive index medium allows for the design of a smaller instrument without sacrificing optical throughput.

Accordingly, since the F-number of light increases as it enters the instrument 100, the instrument can be designed to have a relatively high effective F-number with smaller diameter optical components while still accepting an amount of light comparable to a larger instrument with a lower effective F-number. Thus, utilizing an optically transmissive material (e.g., glass) that has a high index of refraction relative to the environment surrounding the spectrometer 100 enables a small instrument with optical speed comparable to that of a larger instrument to be realizable. Small size can be an important advantage for imaging spectrometers. Since the instrument 100 has a relatively high optical speed for its size, exposure times of the detector array can also be short, which can in turn allow for higher resolution scanning since the time between scans can be shorter.

In one embodiment of the invention substantially incorporating fused silica throughout the optical path of the light within the spectrometer, a compact imaging spectrometer 100 is obtained that is approximately 50 mm long, 40 mm wide, and 22 mm high. In some embodiments of the invention, materials with indexes of refraction greater than that of fused silica may be used to further increase light throughput and achieve even smaller designs.

This strikingly small spectrometer instrument 100 can be used in a wide range of applications. As discussed above, the spectrometer instrument 100 may be used for military, research, manufacturing, medical, and other applications. The spectrometers 100 may be located in stations (e.g., weather or research stations, buoys, etc.) in the field, in laboratories, in manufacturing plants, in medical facilities, etc. The spectrometer 100 may be included in satellites, airplanes and helicopters, unmanned aerial vehicles or on other platforms as well, such as in boats, ships, trucks, cars, balloons, rockets, or other vehicles. The location and use of these spectrometers is not limited.

The spectrometer 100 may be used in the Visible-Near IR band (400-1000 nm), the Short Wave Infrared (SWIR) band (900-2500 nm), the Midwave Infrared (MWIR) band (3-5 microns), and the Longwave Infrared (LWIR) band (8-12 microns). Furthermore, spectrometers designed for use in other spectral bands are possible as well. For example, embodiments of the invention could be designed for use in the UV band.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A spectrometer comprising:
   a first body portion comprising substantially optically transmissive material;
   first and second reflective regions disposed on a first side of said first body portion;
   a reflective grating disposed on a second side of said first body portion; and
   a second body portion comprising substantially optically transmissive material disposed with respect to said first body portion with said reflective grating therebetween,
   wherein said first and second reflective regions and said reflective grating are arranged with respect to each other such that light incident on said first reflective region is reflected to said grating, diffracted from said grating to said second reflective portion, and reflected from said second reflective portion into said second body portion.

2. The spectrometer of claim 1, wherein said first and second body portions have surfaces that substantially mate with each other.

3. The spectrometer of claim 1, wherein said first and second body portions are bonded together with an adhesive.

4. The spectrometer of claim 2, wherein said adhesive has an index of refraction substantially matching that of said optically transmissive material comprising said first and said second body portions.

5. The spectrometer of claim 1, wherein said first and second reflective regions are disposed on a surface of said first body portion.

6. The spectrometer of claim 1, wherein said first and second reflective regions are curved.

7. The spectrometer of claim 6, wherein said first and second reflective regions comprise concave reflectors and said reflective grating comprises a convex reflector.

8. The spectrometer of claim 7, wherein said first and second reflective regions have substantially the same curvature.

9. The spectrometer of claim 8, wherein said first and second reflective regions and said reflective grating have curvatures defined by substantially concentric centers of curvature.

10. The spectrometer of claim 8, wherein said first reflective region and said reflective grating have curvatures defined by nearly concentric centers of curvature that are offset with respect to each other and second reflective region and said reflective grating have curvatures defined by nearly concentric centers of curvature that are offset with respect to each other.

11. The spectrometer of claim 1, wherein said reflective grating comprises a holographic grating.

12. The spectrometer of claim 1, further comprising a slit, light passing through said slit propagating to said first reflective region.

13. A spectrometer comprising:
   a body comprising a mass of substantially optically transmissive material;
   a first reflector;
   a curved reflective grating, said first reflector and said curved reflective grating defining a first optical path therebetween, said first reflector and said reflective grating disposed with respect to said body such that said first optical path substantially comprises said substantially trausmissive material;
   a detector defining a second optical path extending from said curved reflective grating to said detector, said second optical path substantially comprising said substantially trausmissive material;
   a second reflector disposed in said optical path from said curved grating to said detector such that light diffracted from said curved reflective grating is reflected from said second reflector to said detector,
   wherein said first reflector and grating have curvatures defined by nearly concentric centers of curvature that are offset with respect to each other and said second reflector and grating have curvatures defined by nearly concentric centers of curvature that are offset with respect to each other.

14. A spectrometer comprising:
   a body comprising a mass of substantially optically transmissive material;
   a first curved reflector;
   a reflective grating, said first curved reflector and said reflective grating defining a first optical path therebetween, said first curved reflector and said reflective grating disposed with respect to said body such that said first optical path substantially comprises said substantially transmissive material; and
   a second curved reflector, said first and second curved reflectors defined by substantially concentric centers and radii of curvature, said reflective grating having a curvature defined by a center of curvature that is nearly concentric but offset from said centers of curvature of said first and second curved reflectors,
   wherein said reflective grating is configured to reflect broadband light having a bandwidth of at least about 400 nanometers to a detector via a second optical path comprising said substantially transmissive material.

15. A spectrometer comprising:
   a first body portion comprising substantially optically transmissive material;
   first and second reflective regions disposed on a first side of said first body portion; and
   a reflective grating disposed on a second side of said first body portion,
   wherein said first and second reflective portions and said reflective grating are arranged with respect to each other such that broadband light at least about 300 nanometers in bandwidth propagating through said substantially optically transmissive material incident on said first reflective region is reflected to said grating, diffracted from said grating through said substantially optically transmissive material to said second reflective portion, and reflected from said second reflective portion through said optically transmissive material,
   wherein said first and second reflective regions are curved with a curvature defined by a first sphere, said reflective grating has a curvature defined by a second sphere, and said first and second spheres are substantially concentric and the radius of said first sphere is approximately twice that of said sphere, and
   wherein said first and second spheres defining the curvature of said first and second reflective regions and said grating are offset.

16. The spectrometer of claim 1, wherein said first and second body portions have surfaces that are joined to each other.

* * * * *

UNITED STATES PATENT AND TRADEMARK OFFICE
CERTIFICATE OF CORRECTION

PATENT NO. : 7,330,258 B2  Page 1 of 1
APPLICATION NO. : 11/141355
DATED : February 12, 2008
INVENTOR(S) : Chris P. Warren It is certified that error appears in the above-identified patent and that said Letters Patent is hereby corrected as shown below:

<u>On the Title page item (73),</u>

After "Inc.," insert -- dba Novasol --.

<u>Column 16</u>

Line 4, In Claim 13, delete "trausmissive" insert -- transmissive --, therefor.

<u>Column 16</u>

Line 8, In Claim 13, delete "trausmissive" insert -- transmissive --, therefor.

Signed and Sealed this

Eleventh Day of November, 2008

JON W. DUDAS
*Director of the United States Patent and Trademark Office*